United States Patent
Heinrichsdorff et al.

(10) Patent No.: US 11,733,678 B2
(45) Date of Patent: Aug. 22, 2023

(54) METHOD FOR DETERMINING BUILDING INSTRUCTIONS FOR AN ADDITIVE MANUFACTURING METHOD, METHOD FOR GENERATING A DATABASE WITH CORRECTION MEASURES FOR CONTROLLING THE PROCESS OF AN ADDITIVE MANUFACTURING METHOD

(71) Applicant: Siemens Aktiengesellschaft, Munich (DE)

(72) Inventors: Frank Heinrichsdorff, Teltow (DE); Darya Kastsian, Falkensee (DE); Ursus Krüger, Berlin (DE); Daniel Reznik, Berlin (DE); Heinz Neubert, Albershausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 425 days.

(21) Appl. No.: 17/251,553

(22) PCT Filed: Jun. 3, 2019

(86) PCT No.: PCT/EP2019/064263
§ 371 (c)(1),
(2) Date: Dec. 11, 2020

(87) PCT Pub. No.: WO2019/238440
PCT Pub. Date: Dec. 19, 2019

(65) Prior Publication Data
US 2021/0255602 A1 Aug. 19, 2021

(30) Foreign Application Priority Data

Jun. 12, 2018 (EP) ..................... 18177250

(51) Int. Cl.
*G05B 19/4099* (2006.01)
*B33Y 10/00* (2015.01)
(Continued)

(52) U.S. Cl.
CPC .......... *G05B 19/4099* (2013.01); *B22F 10/36* (2021.01); *B22F 10/368* (2021.01);
(Continued)

(58) Field of Classification Search
CPC ...... G05B 19/4099; G05B 2219/49013; G05B 2219/49214; B22F 10/36; B22F 10/368;
(Continued)

(56) References Cited

U.S. PATENT DOCUMENTS

| | | | |
|---|---|---|---|
| 2004/0026807 A1 | 2/2004 | Andersson et al. | 264/40.1 |
| 2012/0267345 A1 | 10/2012 | Clark | 219/121.35 |

(Continued)

FOREIGN PATENT DOCUMENTS

| | | | | |
|---|---|---|---|---|
| CA | 3 019 409 | 10/2017 | | G06F 17/50 |
| CN | 1426335 A | 6/2003 | | B22F 3/105 |

(Continued)

OTHER PUBLICATIONS

Search Report for International Application No. PCT/EP2019/064263, 12 pages, dated Sep. 18, 2019.
(Continued)

*Primary Examiner* — Michael J Brown
(74) *Attorney, Agent, or Firm* — Slayden Grubert Beard PLLC (57) ABSTRACT

Various embodiments include a method for additive manufacturing of a building structure on using a simulation comprising: accessing a data set for the building structure describing the building structure in layers; calculating a global heat development in previous layers based a building history and heat input by an energy beam; determining a
(Continued)

local heat development in a vicinity of the heat input; determining the process control based on the global and the local heat development; loading correction measures from a database; and assigning the correction measures locally to individual vectors of a tool path of the energy beam. At least one mass integral is calculated for individual vectors of the tool path. The measures are determined on the basis of a comparison of the calculated mass integral with mass integrals stored in the database.

15 Claims, 3 Drawing Sheets

(51) Int. Cl.

| | | |
|---|---|---|
| *B22F 10/36* | (2021.01) | |
| *B33Y 50/02* | (2015.01) | |
| *B29C 64/153* | (2017.01) | |
| *B29C 64/393* | (2017.01) | |
| *B22F 10/368* | (2021.01) | |
| *B22F 10/85* | (2021.01) | |
| *B33Y 50/00* | (2015.01) | |
| *B22F 10/28* | (2021.01) | |
| *B22F 12/49* | (2021.01) | |
| *B22F 12/67* | (2021.01) | |
| *B22F 12/90* | (2021.01) | |
| *B22F 10/47* | (2021.01) | |

(52) U.S. Cl.
CPC ............ *B22F 10/85* (2021.01); *B29C 64/153* (2017.08); *B29C 64/393* (2017.08); *B33Y 10/00* (2014.12); *B33Y 50/02* (2014.12); *B22F 10/28* (2021.01); *B22F 10/47* (2021.01); *B22F 12/49* (2021.01); *B22F 12/67* (2021.01); *B22F 12/90* (2021.01); *G05B 2219/49013* (2013.01); *G05B 2219/49214* (2013.01)

(58) Field of Classification Search
CPC .......... B22F 10/85; B22F 10/28; B22F 10/47; B22F 12/90; B29C 64/153; B29C 64/393; B33Y 50/02; B33Y 10/00; B33Y 50/00; Y02P 10/25
USPC ........................................................ 700/98
See application file for complete search history.

(56) References Cited

U.S. PATENT DOCUMENTS

| | | | |
|---|---|---|---|
| 2013/0108726 A1 | 5/2013 | Uckelmann et al. | 425/174.4 |
| 2014/0228991 A1 | 8/2014 | Livingston et al. | 700/97 |
| 2015/0045928 A1 | 2/2015 | Perez et al. | 700/110 |
| 2016/0370791 A1 | 12/2016 | Revanur et al. | 700/98 |
| 2017/0190124 A1 | 7/2017 | Douilly et al. | |
| 2017/0246810 A1 | 8/2017 | Gold | |
| 2017/0282246 A1 | 10/2017 | Liebl et al. | |
| 2017/0308062 A1 | 10/2017 | Albert et al. | |
| 2017/0357671 A1 | 12/2017 | Sippel | |
| 2017/0364058 A1 | 12/2017 | Jagdale et al. | |
| 2018/0009165 A1 | 1/2018 | Agawa | |
| 2018/0043432 A1 | 2/2018 | Domrose | |
| 2018/0099331 A1 | 4/2018 | Hoebel et al. | |
| 2018/0129187 A1 | 5/2018 | Spieker et al. | |
| 2018/0154445 A1 | 6/2018 | Barr et al. | |
| 2018/0215102 A1* | 8/2018 | Amaya | B33Y 50/02 |
| 2018/0246501 A1 | 8/2018 | Beyer et al. | |
| 2018/0290381 A1 | 10/2018 | Volkov | |

FOREIGN PATENT DOCUMENTS

| | | | | |
|---|---|---|---|---|
| CN | 101199994 A | 6/2008 | ............. | B22F 3/105 |
| CN | 103635305 A | 3/2014 | ............. | B29C 67/00 |
| CN | 105492981 A | 4/2016 | ......... | G05B 19/4099 |
| CN | 105555509 A | 5/2016 | ............. | B29C 48/92 |
| CN | 106925990 A | 7/2017 | ............. | B23P 19/10 |
| CN | 107116790 A | 9/2017 | ............. | B22F 3/105 |
| CN | 107368642 A | 11/2017 | ............. | G06F 17/50 |
| CN | 107506510 A | 12/2017 | ............. | G06F 17/50 |
| CN | 107530962 A | 1/2018 | ............. | B22F 3/105 |
| CN | 107584760 A | 1/2018 | ........... | B29C 64/153 |
| CN | 107599382 A | 1/2018 | ........... | B29C 64/124 |
| CN | 107807568 A | 3/2018 | ............. | B22F 3/105 |
| CN | 107914011 A | 4/2018 | ............. | B22F 3/105 |
| CN | 108027608 A | 5/2018 | ........... | G05B 19/418 |
| CN | 108058175 A | 5/2018 | ............. | B25J 11/00 |
| CN | 108062432 A | 5/2018 | ............. | G06F 17/50 |
| CN | 108136500 A | 6/2018 | ............. | B22F 3/105 |
| DE | 102014113997 A1 | 3/2016 | ............. | B22F 3/105 |
| EP | 3225334 A1 | 10/2017 | ............. | B22F 3/105 |
| WO | 2017 174160 | 10/2017 | ............. | G06F 17/50 |

OTHER PUBLICATIONS

Search Report for EP Application No. 18177250.0, 13 pages, dated Jul. 5, 2019.
Li C. et al.: "A Multiscale Modeling Approach For A Fast Prediction Of Part Distortion In Selective Laser Melting", Journal of Material processing technology, vol. 229, pp. 703-712, XP029332947, 2015.
Chinese Office Action, Application No. 201980039348.2, 15 pages, May 17, 2022.
Long, Ri-sheng et al., "Numerical Simulation of Temperature Field on Laser Metal Deposition Shaping," Equipment Manufacturing Technology Research, vol. 31, 4 pages (Chinese w/ English abstract), Aug. 4, 2007.
Zhang, Zhao et al., "Finite Element Simulation of Laser Additive Manufacturing Processes," Machinery Research and Application, vol. 29, No. 143, pp. 136-139 (Chinese w/ English abstract), 2016.
Lei, Wei et al., "Numerical Simulation on Laser Additive Manufacturing Process for Metal Components," Aerospace Manufacturing Technology, vol. 13, pp. 16-25 (Chinese w/ English abstract), 2017.
Chinese Notice of Allowance, Application No. 201980039348.2, 9 pages, dated Oct. 24, 2022.

* cited by examiner

METHOD FOR DETERMINING BUILDING INSTRUCTIONS FOR AN ADDITIVE MANUFACTURING METHOD, METHOD FOR GENERATING A DATABASE WITH CORRECTION MEASURES FOR CONTROLLING THE PROCESS OF AN ADDITIVE MANUFACTURING METHOD

CROSS-REFERENCE TO RELATED APPLICATIONS

This application is a U.S. National Stage Application of International Application No. PCT/EP2019/064263 filed Jun. 3, 2019, which designates the United States of America, and claims priority to EP Application No. 18177250.0 filed Jun. 12, 2018, the contents of which are hereby incorporated by reference in their entirety.

TECHNICAL FIELD

The present disclosure relates to additive manufacturing. Various embodiments include methods for determining building specifications describing process control for the additive manufacturing of a building structure on the basis of a simulation of the manufacture of the building structure.

BACKGROUND

Additive manufacturing methods in the sense of this application should be understood to mean methods in which the material from which a component is intended to be manufactured is added to the component during production. In this case, the component already arises in its final shape or at least approximately in this shape.

To be able to manufacture the component, data (CAD model) describing the component are conditioned for the additive manufacturing method chosen. In order to create instructions for the manufacturing installation, the data are converted into data of a workpiece to be manufactured which are adapted to the manufacturing method in order that the suitable process steps for progressively manufacturing said workpiece can proceed in the manufacturing installation. For this purpose, the data are conditioned such that the geometric data for the layers (slices) of the workpiece that are to be manufactured in each case are available, which is also referred to as slicing. The workpiece can have a shape that deviates from the component. By way of example, a production-dictated component warpage can be taken into account, which is compensated for by a deviating workpiece geometry. Moreover, the workpiece usually has supporting structures that have to be removed again during subsequent processing of the component.

The starting point for carrying out an additive manufacturing method is a description of the workpiece in a geometry dataset, for example as an STL file (STL stands for Standard Tessellation Language). The STL file contains the three-dimensional data for conditioning for the purpose of production by means of the additive manufacturing method. A manufacturing data set, for example a CLI file (CLI stands for Common Layer Interface), is generated from the STL file, said manufacturing dataset containing a conditioning of the geometry of the workpiece in layers or slices that is suitable for additive manufacturing.

The transformation of the data is referred to as slicing. Moreover, the machine requires further stipulations for production, e.g. the height of the layers to be manufactured, the orientation of the write vectors, that is to say direction and length of the path described by the energy beam on the surface of the powder bed, and the division of the workpiece layer to be produced into sectors in which specific method parameters are applicable. Furthermore, focus diameter and power of the energy beam used are to be defined. The CLI file and the manufacturing data together determine a flowchart according to which the workpiece descried in the STL file can be additively manufactured layer by layer in the manufacturing installation.

Building specifications means data made available to a machine for the additive manufacturing of the building structure. They include the process parameters for the energy beam (for example a laser beam) and also the definition of a tool path. The energy beam is used as a tool in the production engineering sense, such that the tool path corresponds to the irradiation path of the energy beam. The tool path usually consists of a multiplicity of vectors which are strung together and traversed by the energy beam. The building specifications thus define process control that is processed by the machine for additive manufacturing.

As explained above, additive manufacturing methods are carried out in a computer-aided manner in order to be able to manufacture the real building blocks proceeding from a dataset describing the component to be manufactured. Unless indicated otherwise in the following description, the terms "create", "calculate", "compute", "ascertain", "generate", "configure", "modify" and the like preferably relate to actions and/or processes and/or processing steps which change and/or generate data and/or which convert the data into other data, wherein the data can be represented or be present in particular as physical variables, for example as electrical pulses.

In particular, the expression "computer" should be interpreted broadly to cover all electronic devices having data processing properties. Computers can thus be for example personal computers, servers, handheld computer systems, pocket PC devices, mobile radio devices and other communication devices which can process data in a computer-aided manner, processors and other electronic devices for data processing, which can also be interconnected to form a network. In association with the disclosure, "computer-aided" can be understood to mean for example an implementation of a method in which one computer or a plurality of computers perform(s) at least one method step of the method.

In association with the disclosure, a "processor" can be understood to mean for example a machine or an electronic circuit. A processor can be in particular a Central Processing Unit (CPU), a microprocessor or a microcontroller, for example an application-specific integrated circuit or a digital signal processor, possibly in combination with a storage unit for storing program instructions, etc. A processor can for example also be an IC (Integrated Circuit), in particular an FPGA (Field Programmable Gate Array) or an ASIC (Application-Specific Integrated Circuit), or a DSP (Digital Signal Processor). Moreover, a processor can be understood to mean a virtualized processor or a soft CPU. It can for example also be a programmable processor which is equipped with a configuration for performing the stated method incorporating teachings of the present disclosure.

In association with the disclosure, a "storage unit" can be understood to mean, for example, a computer-readable storage device in the form of a main memory (Random-Access Memory, RAM) or a hard disk.

Examples of additive manufacturing include Selective Laser Sintering (SLS), Selective Laser Melting (SLM) and Electron Beam Melting (EBM). These methods are suitable in particular for the processing of metallic materials in the form of powders which can be used to manufacture construction components. During SLM, SLS and EBM, the components are manufactured layer by layer in a powder bed.

These methods are therefore also referred to as powder-bed-based additive manufacturing methods. A layer of the powder is in each case produced in the powder bed and the energy source (laser or electron beam) then locally melts or sinters said layer in those regions in which the component is intended to arise. In this regard, the component is progressively produced layer by layer and can be removed from the powder bed after completion.

Methods of the type specified in the introduction are described in WO 2017/174160 A1 for example. In accordance with said document, production-dictated shape deviations and stresses in a building structure manufactured by an additive manufacturing method are ascertained by a simulation being carried out. That involves producing so-called superlayers having a plurality of layers to be manufactured, said superlayers thereby reducing the computational complexity during the simulation. In order in that case nevertheless to obtain a simulation result with sufficient accuracy, shrinkage factors for the solidified material are ascertained to calculate an effective shrinkage in the respective superlayer.

The shrinkage is crucially influenced by the temperatures prevailing during the manufacture of the building structure. Therefore, the method described in WO 2017/174160 A1 involves calculating the thermal behavior of the previously manufactured building structure globally and the direct cooling behavior of the melt pool in the currently manufactured layer locally. With the method, although the complexity during the simulation can be reduced, the simulation in advance of manufacture of the building structure is still associated with a significant computational complexity. The end result of the simulation is a building structure in which the shrinkage and the formation of microstructure stresses during shaping are taken into account by a geometry—modified by means of the simulation method—of the building structure being produced, which assumes the desired geometry of the building structure on the basis of the stresses and shrinkages.

SUMMARY

The teachings of the present disclosure develop the methods described herein in such a way as to enable a simulation of an additive manufacturing method that is as accurate as possible with comparatively low computational complexity. Some example embodiments include a method for determining building specifications describing process control (PAR) for the additive manufacturing of a building structure (19) on the basis of a simulation of the manufacture of the building structure (19), wherein for the simulation: a manufacturing data set for the building structure (19), said manufacturing data set describing the building structure (19) in layers (25) to be manufactured, is made available, a global heat development in already manufactured layers (25) of the building structure (19) taking account of a building history of the building structure (19) and the heat input by an energy beam (17) is calculated, the local heat development in the vicinity of the heat input by the energy beam (17) is determined, the process control (PAR) is determined taking account of the global heat development and the local heat development, correction measures of the process control (PAR) are loaded from a database (RULE) depending on the global heat development and the local heat development, the correction measures of the process control (PAR) are assigned locally to individual vectors (30) of a tool path (31) of the energy beam (17), wherein at least one mass integral is calculated for individual vectors (30) of the tool path (31), and suitable correction measures are determined on the basis of a comparison of the calculated mass integral with mass integrals stored in the database (RULE).

In some embodiments, the correction measures of the process control (PAR) are determined in such a way that a melt pool (32) produced by the energy beam (17) has a size that is in a defined interval.

In some embodiments, at least one mass integral is calculated for individual vectors (30) of the tool path (31), wherein integration is effected over a defined integration volume, wherein the integration volume contains a part of the surface of the building structure facing the energy beam (17), wherein a point of the vector (30) considered lies in the integration volume.

In some embodiments, at least one mass integral at the beginning and one mass integral at the end of the vector are calculated for the vectors (30).

In some embodiments, from the mass integrals calculated per vector (30), that mass integral which has the lowest value is selected for the vector.

In some embodiments, a value corresponding to the mean value of the mass integrals is calculated from the mass integrals calculated per vector (30).

In some embodiments, in order to determine the correction measures for a vector (30) considered the calculated mass integral is compared with mass integrals stored in the database (RULE), that stored mass integral which is the most similar to the calculated mass integral is selected from the database, the correction measures of the process control (PAR) stored with the selected mass integral are selected for the vector considered.

In some embodiments, in order to determine the correction measures (PAR) in the form of correction values for a vector (30) considered the calculated mass integral is compared with mass integrals stored in a database (RULE), those stored mass integrals which are the most similar to the calculated mass integral are selected from the database, the correction values for process parameters of the process control (PAR) stored with the selected mass integrals are selected for the vector (30) considered and an interpolation of said correction values is carried out, wherein the result of the interpolation is used as a resulting correction value for the correction.

In some embodiments, the mass integral has the shape of an ellipsoid or of a semi-ellipsoid having a semi-axis $\delta r$ in the x-y-plane of the layer to be manufactured and $\delta z$ in the z-direction.

In some embodiments, the correction measures include a reduction of the power of the energy beam and/or a lengthening of the pause times between the irradiation times of individual vectors (30) and/or an increase of the movement speed of the energy beam (17) and/or an increase of the hatch distance between the vectors (39) and/or an alteration of the vector order and/or an alteration of the vector length and/or an alteration of the vector orientation.

As another example, some embodiments include a method for determining correction measures for building specifications describing process control (PAR) for a method for the additive manufacturing of building structures (19) on the basis of a simulation, wherein for the simulation process: parameters for the process control are defined, a manufacturing data set for the building structure, said manufacturing data set describing the building structure (19) in layers (25) to be manufactured, is made available, a global heat development in the form of a reference temperature Tr is taken into account, the local heat development in the vicinity of the heat input by an energy beam (17) is calculated, the local heat development in the vicinity of the heat input by the energy beam (17) is calculated for representative volume elements (RVE) with a predefined geometry, in the case of a calculated heat development that is excessively high, correction measures of the process control are assigned locally to individual vectors (30) of a tool path (31) of the energy beam, amass integral over a partial volume of the representative volume element (RVE) in which the correction measures are required is calculated, and the correction measures are stored with the associated mass integral in a database (RULE).

In some embodiments, the representative volume elements (RVE) have the shape of parallelepipeds, in particular cubes, and/or prisms having two lateral surfaces extending parallel to the layers (25) and at least one lateral surface extending at an inclination to the layers and connecting the parallel lateral surfaces, and/or triangular prisms having a lateral surface extending parallel to the layers (25).

In some embodiments, a representative volume element (RVE) which is parallelepipedal, in particular, the boundary of which is surrounded all around by the material of the building structure (19), is used to ascertain reference values for the process control, wherein the correction parameters aim to reduce the energy input of the energy beam (17).

In some embodiments, a melt pool size is calculated by calculating the mass integral over a partial volume of the representative volume element (RVE), which contains a part of the surface of the representative volume element (RVE) facing the energy beam (17), which is localized on a plurality of points of the tool path (31), wherein for said points the melt pool size is calculated taking account of the local heat development and the reference temperature Tr.

In some embodiments, the mass integral has the shape of an ellipsoid or of a semi-ellipsoid having a semi-axis δr in the x-y-plane of the layer to be manufactured and δz in the z-direction.

As another example, some embodiments include a computer program product comprising program commands for carrying out the method as described herein.

As another example, some embodiments include a computer program product comprising program commands for a manufacturing installation which is configured by means of the program commands to produce the workpiece as described herein.

BRIEF DESCRIPTION OF THE DRAWINGS

The exemplary embodiments described herein are examples only and do not limit the scope of the disclosure. In the exemplary embodiments, the described components of the embodiments each represent individual features of the teachings which should be considered independently of one another and which in each case also develop the teachings independently of one another and should thus also be regarded as part of the teaching individually or in a different combination than that shown. Furthermore, the embodiments described are also able to be supplemented by further features from among those elsewhere described.

In the figures.

DETAILED DESCRIPTION

In some embodiments, the following steps are performed for a simulation. A manufacturing data set for the building structure, said manufacturing data set describing the building structure in layers to be manufactured, is made available. A global heat development in the already manufactured layers of the building structure taking account of a building history of the building structure and the heat input by an energy beam is calculated. The local heat development in the vicinity of the heat input by the energy beam is determined. The process control is determined taking account of the global heat development and the local heat development.

Some examples include a method for determining correction measures of the process control of a method for the additive manufacturing of building structures on the basis of a simulation. Said simulation involves defining process control in the form of manufacturing parameters of the additive manufacturing method in order to enable the simulation to be carried out. Furthermore, a manufacturing dataset for the building structure is made available. Said manufacturing data set describes the building structure in layers to be manufactured since the building structure is intended to be manufactured in successive layers. The building structure can consist of a component to be manufactured. However, the building structure often also includes supporting structures which, in a manner governed by production, are manufactured together with the component and are removed from the component after the building structure has been manufactured. The simulation furthermore involves taking account of a global heat development in the component being manufactured in the form of a reference temperature $T_r$. Moreover, the local heat development in the vicinity of the heat input by an energy beam, for example a laser beam, is calculated. As already mentioned, the energy beam traverses a specific tool path that is predefined by the process control and likewise by the process parameters already mentioned.

Some embodiments include a storage format for building instructions for an additive manufacturing method by virtue of a tool path composed of a multiplicity of vectors being defined. A storage format should be understood to mean the configuration of a storage device, wherein the configuration enables specific desired data to be stored. They include the vectors defining the tool path. Said vectors, as already mentioned, define the process control with regard to the required movement of the energy beam.

Some embodiments include a computer program products comprising program commands for carrying out the methods mentioned above and/or a providing device for said computer program products.

In some embodiments, a method for the additive manufacturing of the building structure is intended to determine the process control. The teachings herein include methods for determining correction measures of process control for manufacturing building structures in which the correction measures are ascertained on the basis of a simulation and/or storage formats which can be used to flexibly store building instructions for an additive manufacturing method and thus the process control of the additive manufacturing method.

In some embodiments, a method for determining building specifications describing process control for the additive manufacturing of a building structure, said method being indicated in the introduction, in that correction measures of the process control are loaded from a database depending on the global heat development and the local heat development. Said correction measures of the process control are then assigned locally to individual vectors of the tool path of the energy beam. Various measures are suitable as correction measures of the process control that results from the building specifications, which measures will be explained in greater detail below.

In some embodiments, at least one of the following correction measures can be used for correction:
- a reduction of the power of the energy beam, thereby reducing the heat input onto the surface of the component that is arising.
- A lengthening of the pause times between the irradiation times of individual vectors, thereby reducing the energy input per unit time and thus the power density of the energy that is input.
- An increase of the movement speed of the energy beam, thereby reducing the power input per unit area since the energy beam irradiates a specific area element of the surface for a shorter time.
- An increase of the hatch distance between the vectors, that is to say the distance between lines of the irradiation that run parallel, as a result of which the energy density per unit area is reduced by virtue of fewer vectors running in the unit of area.
- An alteration of the vector order, which makes it possible to achieve the effect, for example, that vectors in regions of critical heat development are not irradiated directly in succession, but rather at a longer time interval. In this case, the pause times do not increase, rather other noncritical vectors are exposed in the interim, for example.
- An alteration of the vector length, wherein shorter vectors are provided in regions of critical heat development, for example, in order that an earlier change to a different partial region of the area to be exposed is effected locally.
- An alteration of the vector orientation, wherein the vector orientation can be changed for example such that a larger proportion of the vector runs in regions of the area to be exposed which, in comparison with the original course, are less critical with regard to excessive heat development.

The above correction measures have in common reduction of the power input into the building structure. Specifically, a major problem in the manufacture of components by additive manufacturing methods resides in the overheating of the building structure that is arising. Normally, for example, the process parameters for the energy beam are tested on a standard body, such as e.g. a solid cube, and subsequently fixed. However, a building structure to be produced in reality often includes thin-walled or overhanging structures. In these regions, the already manufactured partial body of the building structure makes available locally a significantly lower thermal capacity, such that at these points the manufactured structure overheats locally when the standardized process parameters are used. This results in undesirably large melt pools and thus in an increase in stresses and strains in the finished manufactured component. Moreover, component defects can occur on account of the formation of large melt beads in the further construction of the building structures. These may severely disturb the application of subsequent powder layers and even necessitate termination of the process if a collision between an enlarged melt bead and the coating apparatus might damage the workpiece or the coating apparatus.

This problem can be prevented if the power input into the surface of the already manufactured building structure is reduced in identified regions of the building structure to be manufactured. In some embodiments, the correction measures of the process control can be determined in such a way that a melt pool produced by the energy beam has a size that is in a defined interval. This interval takes account of the fact that an accurate setting of the melt pool size is not possible in terms of production engineering. Certain tolerances must be allowed, wherein the permissible tolerances determine the interval. It is possible for example to measure (by means of experiments) what deviations of the melt pool size are still acceptable without unacceptable losses in quality occurring for the component. In this regard, the interval is defined.

If the melt pool becomes too large in the ongoing method, then it is necessary to reduce the power. In this case, the size of the melt pool can be defined by its volume of molten material. Moreover, it is possible to use the radial and/or depth extent as a measure of the size. This gives rise to a target size, wherein the interval is defined by the permissible tolerance deviations from the target size.

In some embodiments, the melt pool size may be calculated by means of a simulation. Said simulation takes account of the building history of the component, e.g. how the previous component arose. The geometry of the component, in particular the volume and heat capacity of the material, and also the history of the energy input are of importance here. The calculation of the heat distribution in the already manufactured component shall be referred to hereinafter as macroscale simulation since the geometry of the already manufactured component in its entirety is taken into account here.

In order to minimize the computational complexity and at the same time to obtain a well approximated simulation result, the example methods use an incomplete process simulation in order to obtain the data for correcting the process control. An incomplete process simulation is understood to mean a calculation which implements the temperature distribution and the stress-strain behavior either in the entire workpiece under simplified assumptions or with realistic assumptions, but in a greatly reduced calculation volume. This measure makes it possible for economically attractive computation times to be obtained at all in the process simulation of additive manufacturing methods using computers available at the present time.

In some embodiments, in the method for determining the process control, the heat development in the already manufactured layers of the building structure is calculated individually for each building structure under simplified assumptions. Since the heat distribution in the already manufactured building structure changes slowly in comparison with the cooling of the melt pool, a calculation under simplified conditions is sufficient in principle. In this regard, it can be assumed, for example, that the cumulated energy input of the energy beam is input over the entire area of the manufactured layer.

The calculation of the temperature distribution in the melt pool necessitates a higher complexity in order to be able to predict the complex processes. Within the scope of the invention in this context the order of magnitude for calculating the melt pool or the freshly melted track is referred to as mesoscale simulation.

In this case, it is possible to calculate the heat input by the energy beam depending on the direct surroundings of the component (even more details about this are given below).

The computational complexity associated with the mesoscale simulation may be reduced by a database being created for calculated mesoscale heat distributions, correction measures for the process control being made available in said database. Said correction measures can be selected by the surroundings of the component being analyzed geometrically without complex calculation of the temperature distribution in the region of the melt pool. As a result, the computational complexity may be considerably reduced, which is why it is possible to assign individual correction measures locally to individual vectors of the tool path of the energy beam. This makes it possible to modify the process control while the energy beam traverses the tool path. In particular, the heat input can be reduced individually by the correction measures in regions with a critical tendency toward overheating. As a result, in conjunction with low computational complexity, there is not just an improvement in the quality of the manufactured component (avoidance of defects such as weld beads). The formation of stresses and strains in the manufactured building structure can be reduced as well.

In order to be able to assess the geometry of the local surroundings of the melt pool, at least one mass integral may be calculated for individual vectors of the tool path. In this case, integration is effected over a defined volume (even more details about this are given below). The integration volume furthermore includes a part of the surface of the building structure that is arising, said surface facing the energy beam. In this regard, it is possible for a point of each vector to lie in the integration volume. The integration volume is advantageously embodied as centrosymmetric, such that the considered point of the vector lies in the center of said integration volume. In some embodiments, at the same time other points of the vector then also lie in the integration volume. A reference point is defined, however, which may lie in the center of the integration volume. The centrosymmetry arises in the plane of the surface of the building structure.

The calculation of a mass integral has proved to be an easily calculable and nevertheless meaningful measure for assessing the thermal behavior of the building structure in the surroundings of the melt pool. The mass integral is proportional to the heat capacity in the direct surroundings of the melt pool and therefore represents a good measure for assessing the local thermal behavior of the building structure that is arising. The correction measures may be stored in the database with associated mass integrals, such that the selection of suitable correction measures can be chosen taking account of the similarity of the mass integrals (even more details about this are given below). In this case, suitable correction measures can also be determined on the basis of a comparison of the calculated mass integral with mass integrals stored in the database. In this case, a similarity can be ascertained with regard to a similarity measure. For example by a difference measure of the mass integral determined and the mass integral stored in the database.

Along the tool path, at some points (e.g. once per vector) the mass integral weighted with the function $w(x,y,z)$ $$M=\iiint_V \rho(x,y,z) \cdot w(x,y,z)$$

is formed, wherein the integration volume V is preferably a semi-ellipsoid having a semi-axis $\delta r$ of the extent in the x-y-plane and a semi-axis $\delta z$ of the extent in the negative z-direction, wherein $\delta r$ and $\delta z$ are suitably chosen parameters.

In some embodiments, at least one mass integral must be calculated for each vector, and can then be used in a manner representative of the vector. If the length of the vectors is short, deviations that arise over the length of the vectors for the mass integral can be disregarded without excessively large deviations having to be accepted. Particularly in the case of longer vectors, however, it is also possible to calculate a plurality of mass integrals for the vector.

In some embodiments, at least one mass integral at the beginning and one mass integral at the end of the vector can be calculated for the vectors. In some embodiments, a further mass integral could be calculated in the center of the vector. In some embodiments, support points may be defined on the vector at regular intervals, the mass integral being calculated for said support points.

In some embodiments, from the mass integrals calculated per vector, that mass integral which has the lowest value can be selected for the vector. As a result, the heat input by the energy beam is in any case restricted to such an extent that overheating cannot occur. The reduction of the heat input then turns out rather to be too high owing to the minimum mass integral being taken into account.

In some embodiments, a value corresponding to the mean value of the mass integrals is calculated from the mass integrals calculated per vector. This strives for a compromise such that for one thing the reduction of the energy input for the relevant vector on the one hand turns out to be high enough in order to prevent overheating, and on the other hand turns out not to be excessively large in order to prevent the material from no longer being completely melted or at least the melt pool from becoming too small.

In some embodiments, on the basis of the minimum value of the mass integral M (alternatively the mean value of M) along the vector and the expected reference temperature $T(z)$, on account of the rules stored in the database, which are preferably present in the form of an analytical function f such as e.g.

Laser power=$f(M\_\min(\text{vector}),\text{vector length},T)$ with the use of the minimum value
or Laser power=$f(M\_med(\text{vector}),\text{vector length},T)$ with the use of the mean value
or else a table suitable for the interpolation, a correction of the process parameters is calculated for each vector of the tool path.

In some embodiments, the method may adapt the laser power from the starting point to the end point of the vector, or (if the mass integral has an excessively large spread) to subdivide the scan vector into subvectors with an adapted power in each case. The realization requires the definition of a job file format which is extended by comparison with the prior art and which enables the possibility for power variation within scan vectors, and an extension of the current SLM machine controllers, which at the present time are not yet designed for the processing of such an extended job file format (even more details about this are given below).

In some embodiments, various methods can be employed for determining the correction measures for the vector considered. In this case, the calculated mass integral of the surroundings of the building structure can be compared with mass integrals stored in the database. That stored mass integral which is the most similar to the calculated mass integral is then selected from the database. The correction measures of the process control stored with the selected mass integral are then selected for the vector considered and thus define a possibly required reduction of the heat input. The global heat development that was calculated in accordance with the method is also taken into account in this case. This heat development can be taken into account for example as a global temperature $T_g$. The global heat development and the local heat development can be added, for example, in order to calculate the total thermal loading at the location of the melt pool. Another possibility is to use the global heat development to select a suitable mass integral in the database. In this case, the mass integrals are simulated at a specific reference temperature $T_r$ describing the global temperature level of the component.

In some embodiments, to determine the correction measures, which in this case are in the form of correction values, the calculated mass integral is compared with mass integrals stored in a database. Those stored mass integrals which are the most similar to the calculated mass integral are selected from the database. This can involve a plurality of mass integrals (in particular two), which both lie in the vicinity of the calculated mass integral. The correction values for the process parameters of the process control stored with the selected mass integrals are then selected for the vector considered, wherein an interpolation of said correction values is carried out. The result of this interpolation is then used as a resulting correction value for the correction of the process control.

If the mass integrals for different reference temperatures are stored, then the selected mass integrals which are the most similar to the calculated mass integrals can also be mass integrals which have reference temperatures similar to the global temperature but not the same temperature. An interpolation of the correction values is possible here as well.

In some embodiments, the correction measures have to be present in the form of correction values for an interpolation. In other words, the correction measure may be expressed as a numerical value, for example in the reduction of the laser power or increase of the hatch distance or lengthening of a pause time. What is achieved by an interpolation is that in the case of a limited supply of elements in the database, a comparatively accurate correction of the process control nevertheless becomes possible. The associated computational complexity of an interpolation is very low in comparison with the simulation complexity saved, such that the economic viability of the method may be improved.

In some embodiments, the mass integral can have the shape of an ellipsoid or a semi-ellipsoid, wherein a semi-axis $\delta r$ lies in the x-y-plane of the layer to be manufactured and the major axis of the ellipsoid $\delta z$ lies in the z-direction. In particular, the ellipsoid can also be spherical. The shape of said mass integrals is centrosymmetric and similar in shape to the geometry of the melt pool. In this way, the surroundings of the melt pool can be assessed with identical weighting in all directions, which is why the result of the mass integral can be adapted well to reality.

In some embodiments, a method for determining correction measures for the process control of a method for additive manufacturing includes the following steps. The local heat development in the vicinity of the heat input by the energy beam is calculated for representative volume elements with a predefined geometry. In the case of a calculated heat development that is excessively high, correction measures of the process control are assigned locally to individual vectors of a tool path of the energy beam. A mass integral over a partial volume of the representative volume element is calculated, wherein the correction measures are required in said partial volume. The correction measures are then stored with the associated mass integral in a database. As further predefinitions, it is also possible to take account of the temperature which is predefined by a global heat development of a workpiece containing the representative volume element. Since the latter is not known for a separately considered representative volume element, the representative volume element can be calculated for one reference temperature or a plurality of different reference temperatures. Furthermore, the material properties of the processed powder material must be taken into account in the simulation. Mention may be made, in particular, of the melting point and the heat capacity, which influence the behavior of the melt pool at different temperatures. It goes without saying that the tool path must also be defined for the simulation.

In some embodiments, for the representative volume elements, it is possible to simulate the heat development with a comparatively high computational complexity. In this case, the representative volume elements reflect local building structures which are critical during manufacture. These may be overhangs or thin-walled structures with horizontal wall orientations, for example. In the representative volume elements, under the stipulations such as are predefined for the manufacture of real building structures, a temperature development is then ascertained, such that it is possible to assess whether the critical geometry of the representative volume elements would result in critical overheating of a building structure manufactured in reality. Various correction measures can then be calculated. If a correction measure which satisfactorily solves the overheating problem is found for a representative volume element, this correction measure can be stored with the associated mass integral over the representative volume element in the database. A correction measure suitable for the manufacture of a real building structure can therefore be selected by means of a comparison of the mass integrals that were calculated for a real building structure with the mass integrals stored in the database.

Along the tool path for the relevant representative volume element, at some points (e.g. once per vector) the mass integral weighted with the function w(x,y,z)

$$M=\iiint_V \rho(x,y,z)*w(x,y,z)$$

is formed, wherein the integration volume V is preferably a semi-ellipsoid having a semi-axis $\delta r$ of the extent in the x-y-plane and a semi-axis $\delta z$ of the extent in the negative z-direction, wherein $\delta r$ and $\delta z$ are suitably chosen parameters. The calculation can thus be carried out just like in the method for determining building specifications for building structures to be manufactured (as already explained above) since the mass integrals in both methods have to be comparable with one another.

The representative volume elements can likewise be understood as building structures whose geometry provokes overheating with regard to specific critical geometric features. These building structures therefore permit a correction of the building job by means of ascertaining a geometric similarity with a real building structure manufactured later, without the need to simulate the local heat development by the melt pool for the real building structures. This is where the enormous potential for saving with regard to the simulation complexity is manifested where according to the invention the similarity of the simulated representative volume element to a relevant local partial region of the building structure to be manufactured is established by way of the mass integral. Specifically, it has been found that the mass integral represents a sufficient approximation for the assessment of the locally available heat capacity, thereby enabling the selection of the correction measure advantageously by means of a simple comparison of the mass integrals and possibly an interpolation of correction measures (or correction values, as described above).

In some embodiments, the representative volume elements may have the shape of parallelepipeds, in particular cubes, and/or prisms having two lateral surfaces extending parallel to the layers and at least one lateral surface extending at an inclination to the layers and connecting the parallel lateral surfaces, and/or triangular prisms having a lateral surface extending parallel to the layers. This means, in other words, that the prisms simulate with their inclined surfaces overhangs to be manufactured, wherein the latter can occur at different angles in real building structures.

Therefore, the prisms can be used to check one of the most frequently occurring sources of overheating, namely overhangs or undercuts in building structures. The parallelepipeds can be embodied such that they simulate thin-walled structures below which powder material is situated, such that a heat dissipation is substantially restricted to the material of the parallelepiped. As a result, thin-walled structures can be simulated, wherein the latter can be oriented arbitrarily in the powder bed. Inclination is understood to be an angle of the inclined surface with respect to the plane of the layers of $>0°$ to $<90°$. In particular, the inclination can have an angle of $>0°$ and $<30°$ since this inclination surface can be regarded as critical for the heat development in the building structure to be manufactured.

In some embodiments, a representative volume element which is parallelepipedal, in particular, the boundary of which is surrounded all around by the material of the building structure, may be used to ascertain reference values for the process control, wherein the correction parameters aim to reduce the energy input of the energy beam. The parallelepipedal representative volume element thus represents a noncritical partial region of a building structure to be manufactured in which the heat input can be maximized.

For this purpose, it is also necessary, of course, for the heat to be able to be flow away downward and toward the outside of the boundary. As an alternative to a definition of the boundary conditions on the other side of the representative volume element to the effect that the boundary is surrounded by the material of the building structure all around and under the representative volume element, it is also possible to use a representative volume element with a sufficiently large volume, wherein consideration is then given only to the manufacture of a new layer in the center of this representative volume element. Using a representative volume element for ascertaining reference values, it appears possible for different parameter sets for the manufacture of the building structure to be simulated and compared with one another. In some embodiments, it is also possible for the reference values to be oriented to literature values or the recommendations of the manufacturer of the installation.

In some embodiments, in order to calculate a melt pool size, the mass integral over a partial volume of the representative volume element is calculated. Said mass integral contains a part of the surface of the representative volume element facing the energy beam. Moreover, said mass integral is localized on a plurality of points of the tool path, wherein for said points the melt pool size is calculated taking account of the local heat development and a reference temperature $T_r$. In this way, it is advantageously possible to create a mass integral which, as described above, can also be employed in the method for ascertaining the correction measures. This facilitates a comparison of the mass integrals ascertained for the real building structures with those that are stored in the database. In particular, in accordance with one advantages configuration, the mass integral can have the shape of an ellipsoid or of a semi-ellipsoid having a semi-axis $\delta r$ in an x-y-plane of the layer to be manufactured and $\delta z$ in the z-direction. The advantages of such a configuration of the mass integral have already been explained above.

In some embodiments, there is a storage format for building instructions describing process control, wherein said storage format contains for each vector of the tool path storage space for manufacturing parameters of the additive manufacturing method and/or correction parameters for said manufacturing parameters. Said storage format is thus suitable for storing individual manufacturing parameters for each vector. Said individual manufacturing parameters can be manufacturing parameters that have already been corrected by the method specified above. For this application of the storage format, additional storage of correction parameters is no longer necessary and only storage space for the manufacturing parameters may be made available.

Another possibility is afforded by the process control being based on the fact that, as usual according to the prior art, specific standardized manufacturing parameters are defined for the method. However, correction parameters for these standard parameters can then be stored in the storage format. In this application, all that is necessary is to provide storage space for the correction parameters for each vector. However, it is also possible for storage space to be provided both for the manufacturing parameters and for the correction parameters. This makes it possible to change the manufacturing parameters even in a plurality of recursion loops. Even if manufacturing parameters have been defined individually for each vector, they can thus be adapted in the further course of the method by correction parameters for which storage space has likewise been provided vector-individually. This application is therefore advantageously suitable for enabling the storage format to be used flexibly. The two applications mentioned above, in particular, are likewise covered by the last-mentioned storage format.

In some embodiments, there may be storage space for additional vectors, wherein the additional vectors are able to be stored with information regarding which of the vectors already present are intended to be replaced by said vectors. This storage format makes it possible that the course of the tool path can also be altered. If more vectors overall are intended to be provided as a result of the alteration of the tool path, this storage space is advantageously available for storing these vectors. Moreover, it is necessary to be able to store the information regarding where the additional vectors are intended to be inserted. The insertion must give rise again overall to a tool path which consists of a chain of vectors. Only in this way is it ensured that driving of the energy beam with the data stored in the storage format is defined without gaps. A dedicated format for additional vectors is not necessary, however, if just a modified file into which the vectors had already been inserted or replaced is stored.

The abovementioned storage format may be suitable for enabling efficient storage of modified data which take account of the correction measures of the methods specified above. This provides a prerequisite that the storage format according to the invention makes it possible to rapidly retrieve the modified data for carrying out the additive manufacturing method.

Further details of the teachings herein are described below with reference to the drawing. Identical or mutually corresponding elements in the drawing are provided in each case with the same reference signs and are explained repeatedly only in as much as differences arises between the individual figures.

Figure 1:
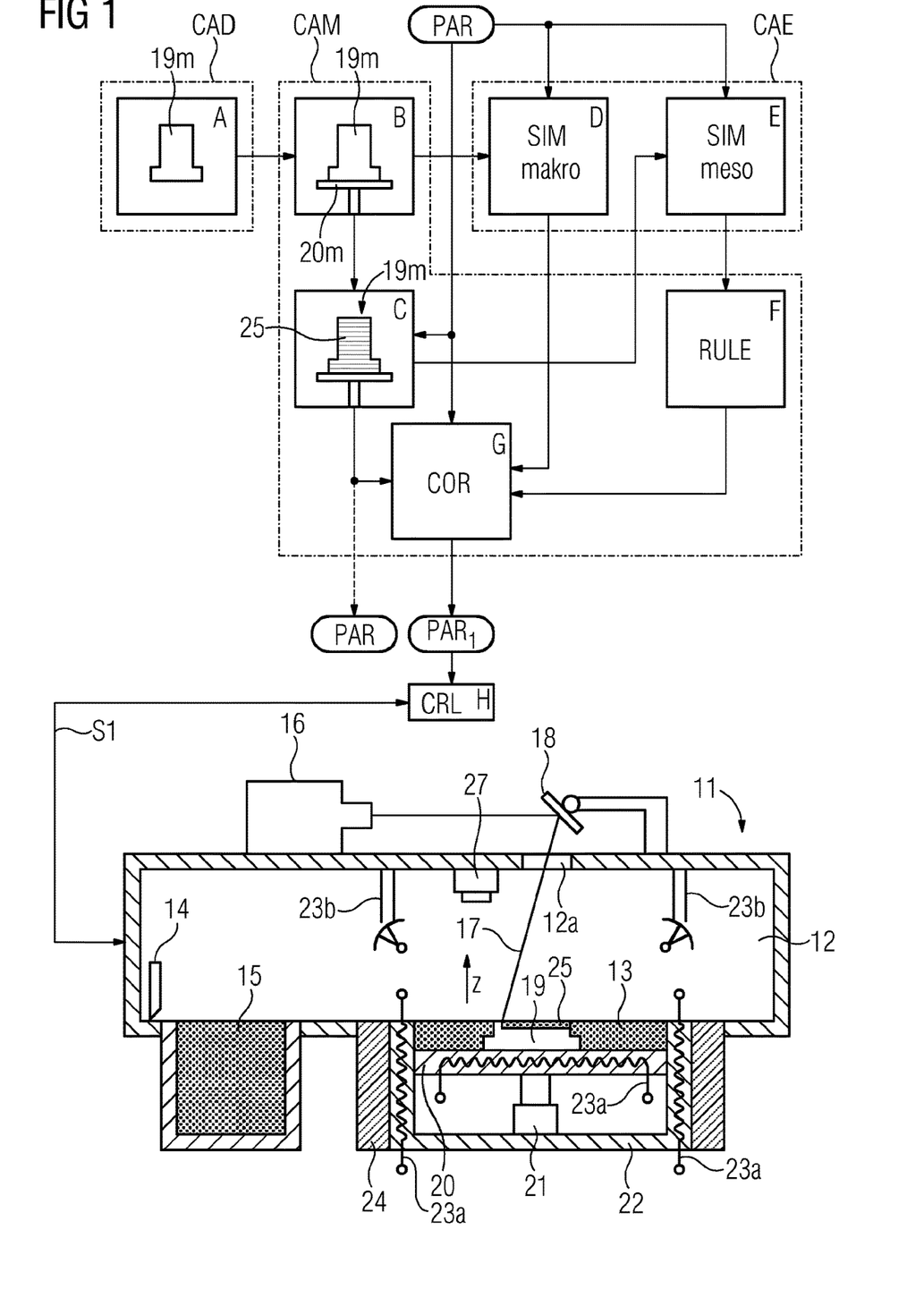
FIG. 1 shows an installation for the additive manufacturing of components in a sectional view with a configuration for the computer-aided implementation of exemplary embodiments of the methods incorporating the teachings herein, wherein the configuration is illustrated as a block diagram of various program modules.

FIG. 1 schematically illustrates an installation 11 for laser melting. Said installation comprises a process chamber 12 having a window 12a, in which a powder bed 13 can be produced. In order to produce a respective layer of the powder bed 13, a distributing device in the form of a squeegee 14 is moved over a powder supply 15 and then over the powder bed 13, thereby giving rise to a thin layer of powder in the powder bed 13, which forms a topmost layer 25 of the powder bed. A laser 16 then generates a laser beam 17, which, by means of an optical deflection device with mirror 18, passes through the window 12a into the process chamber 12 and is moved over the surface of the powder bed 13. In this case, the powder is melted at the point of impingement of the energy beam 17, thereby giving rise to a workpiece or a building structure 19.

The powder bed 13 arises on a building platform 20, which can be lowered by a respective powder layer thickness step by step by means of an actuator 21 in a pot-shaped housing 22. Heating devices 23a in the form of electrical resistance heating facilities (induction coils are alternatively possible too, not illustrated) are provided in the housing 22 and the building platform 20, and can preheat the workpiece 19 that is arising and also the particles of the powder bed 13. In some embodiments, infrared radiators can also be arranged as heating devices 23b in the process chamber 12 in order to irradiate and thereby heat the surface of the powder bed 13. In order to limit the energy requirement for preheating, an insulation 24 having a low thermal conductivity is situated on the exterior of the housing 22. The temperature at the surface of the powder 13 can be ascertained by a thermal imaging camera 27 in order to adapt the heating power of the heating devices 23a, 23b as necessary. As an alternative to the thermal imaging camera 27, it is also possible to use temperature sensors at the powder bed (not illustrated).

The installation 11 for laser melting is controlled by a control device CRL via a first interface S1, which control device must be supplied with suitable process data beforehand. In order to generate the process data PAR, provision is made of one processor or a plurality of processors used to provide a program module CAD for implementing a computer-aided design, a program module CAE for simulating a manufacturing method that is able to be carried out by the manufacturing installation, and also a program module CAM for preparing the method for manufacturing the component 19 by generating the process data $PAR_1$.

Figure 2:
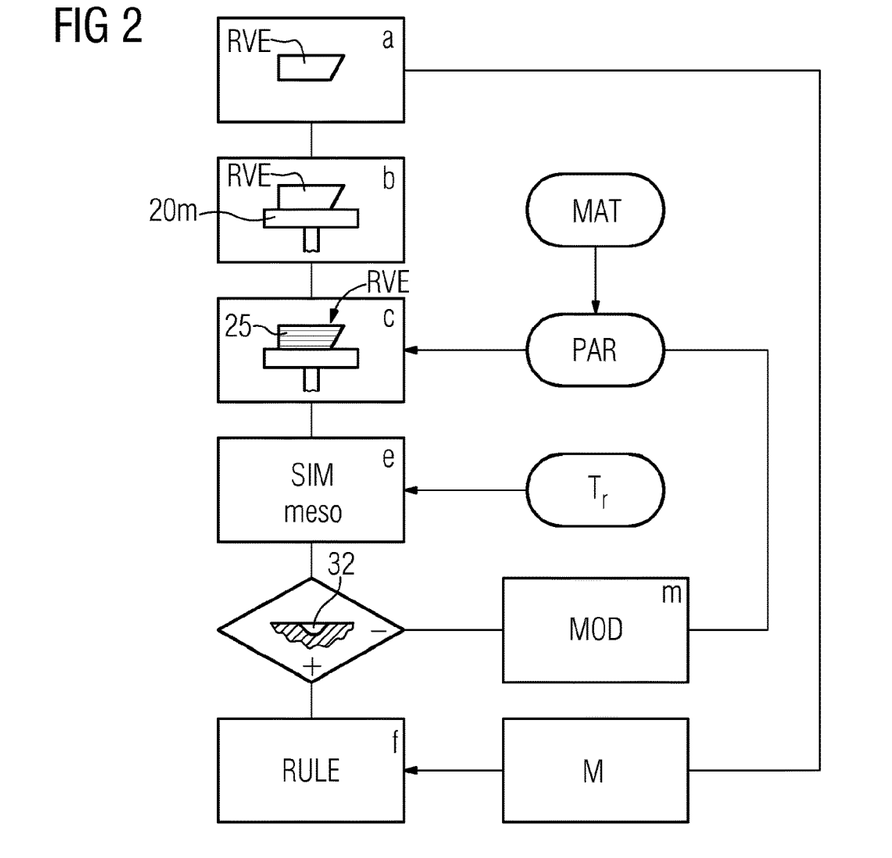
FIG. 2 shows one exemplary embodiment of a method incorporating teachings of the present disclosure for determining correction measures as a flow diagram.
Figure 4:
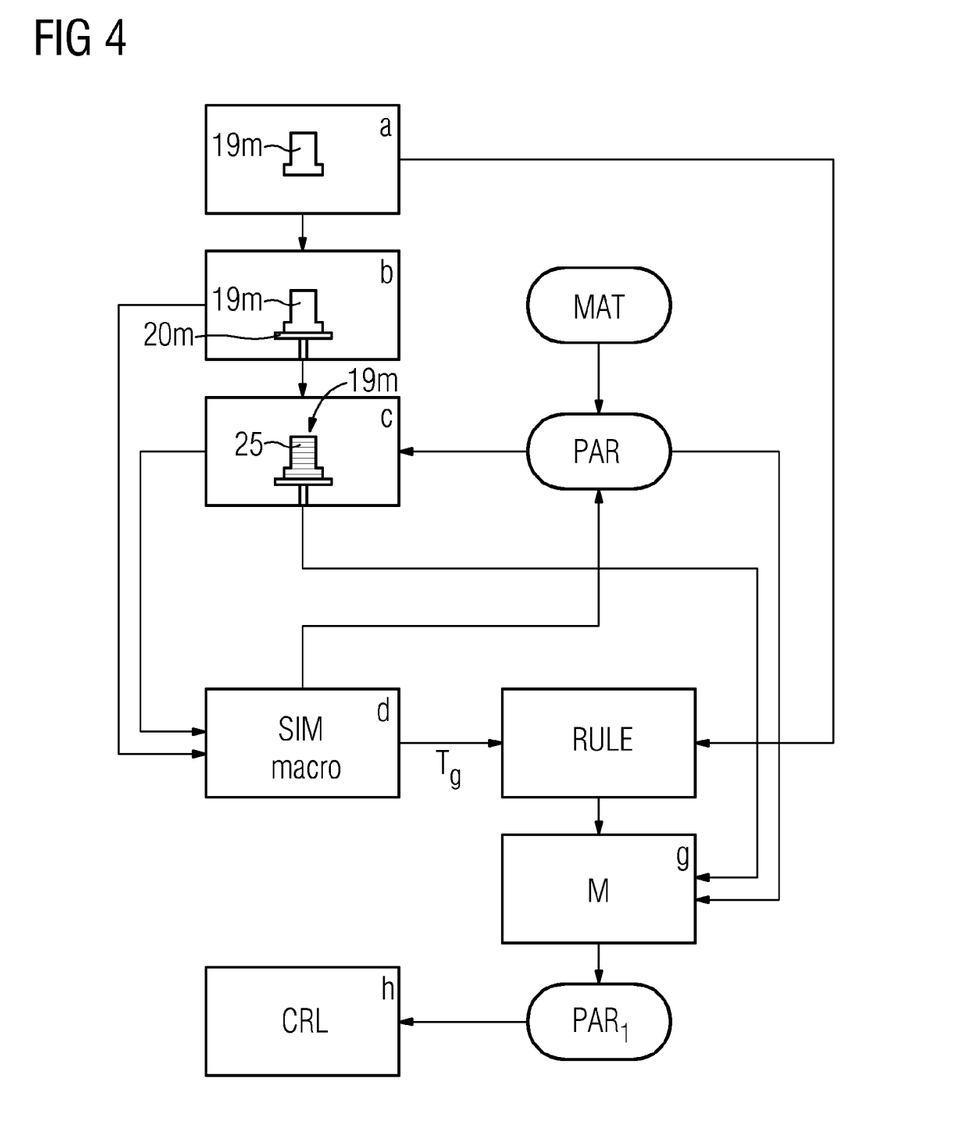
FIG. 4 shows one exemplary embodiment of a method incorporating teachings of the present disclosure for determining building specifications as a flow diagram.

The hardware infrastructures having the programs CAD, CAE and CAM is suitable for implementing one exemplary embodiment of the method according to the invention for determining correction methods in accordance with FIG. 2 and also one exemplary embodiment of the method for determining the process control for manufacturing a component 19 in accordance with FIG. 4. In the explanation of the method sequence in accordance with FIG. 2 and FIG. 4, reference is simultaneously made to the functional structure in accordance with FIG. 1. The individual program modules in FIG. 1 are identified by upper-case letters A to H. The method steps in accordance with FIG. 2 and FIG. 4 are identified by lower-case letters a to m. Insofar as the method steps in accordance with FIG. 2 and FIG. 4 proceed in the program modules in FIG. 1, the chosen lower-case letter in accordance with FIG. 2 and figure respectively corresponds to the chosen upper-case letter in accordance with FIG. 1.

The method for determining correction measures (FIG. 1 in conjunction with FIG. 2) begins with creation of 3-D construction data by the program CAD in the program module A, wherein the geometry of a representative volume element (hereinafter RVE for short) is defined in the method step a. In the program CAM, in a program module B, method step b is carried out, according to which the RVE is positioned on the build plate 20m. The orientation of the RVE is therefore defined on the basis of the surface of the horizontally oriented build plate 20m. In this case, the build plate 20m represents an imaginary image (model) of the build plate 20 of the manufacturing installation for additive manufacturing.

In a next method step c, the operation of so-called slicing and hatching is carried out in the program module C. During slicing, the RVE is subdivided into the layers 25 to be manufactured. During hatching, the tool path is defined, wherein standardized method parameters PAR were taken as a basis here. For selecting the standardized method parameters PAR, it is also necessary to take account of the used material MAT of which the powder consists.

In the program module E, method step e can then be carried out, according to which a mesoscale simulation SIM meso is carried out. This involves taking account of a reference temperature $T_r$ describing the temperature level of the RVE during the simulated manufacture of the current layer. The mesoscale simulation makes it possible also to assess the size of a melt pool 32 (cf. FIG. 3). If the melt pool size does not leave this interval, then it is possible to store the chosen set of method parameters PAR in the storage unit F in a step f, in other words a rule RULE for the relevant method. However, if the melt pool size leaves the allowed interval, then it is necessary to carry out a modification step m with altered method parameters PAR. With this step, there is a return to program step c and the method is subjected to the mesoscale simulation again in program step e. These steps are repeated until the melt pool size of the melt pool 32 lies in the permissible interval.

Figure 3:
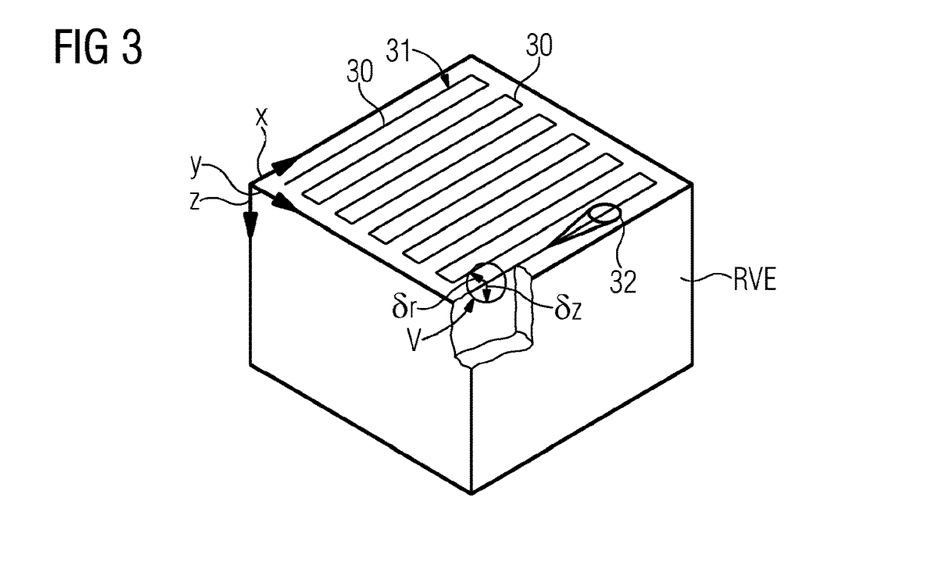
FIG. 3 shows one exemplary embodiment of the representative volume element such as can be employed for determining the correction measures according to a method in accordance with FIG. 2.

For the computed RVE, it is additionally necessary to calculate the mass integral M which is applicable to the vectors 30 of a tool path 31. For this purpose, an integration volume V in accordance with FIG. 3 is taken into account, which integration volume is depicted in the sectional view of one of the vectors 30. This has the shape of an ellipsoid having a radius δr in an x-y-plane on the surface RVE and a depth z in the z-direction. The mass integral M is stored together with the associated method parameters PAR, valid for the vector considered in the rule database RULE of the storage unit F.

A correction module COR in accordance with FIG. 1 can be used for the calculation of the mass integral M and of the method of the step of modifying the method parameters PAR in method step m. Said correction module is a program module which can carry out the modification of data according to specific rules.

If a specific component 19m in accordance with FIG. 4 is then prepared for manufacture, the hardware and software environment in accordance with FIG. 1 can likewise be utilized. The component 19m is a model of the component 19 to be manufactured in accordance with FIG. 1, wherein this model can be created by the program module A in method step a. The subsequent positioning by the program module B in method step b and the slicing and hatching by the program module C in method step c are carried out as described for the RVE with respect to FIG. 2; therefore, this process will not be explained separately again at this juncture.

Firstly, standardized parameters PAR are used in method step c, which parameters were selected depending on the material MAT to be used. Depending on the chosen method parameters PAR which influence the energy input into the building structure 19m, a macroscale simulation SIMmacro can subsequently be carried out by a program module D in a method step d. This involves simulating the temperature development in the manufactured building structure in its entirety, thereby enabling the calculation of the temperature $T_g$ prevailing in the layer 25 to be manufactured. During the macroscale simulation, either the positioned building structure 19m in accordance with method step b or the already sliced building structure 19m in accordance with method step c can be selected as a basis.

Depending on the chosen process parameters PAR, that is to say including the course of the vectors 30 in the tool path 31 and the layers 25 of the sliced model 19m, it is then possible to calculate a mass integral for the individual vectors. This is done by the correction module G in method step g. Once the mass integral M is known, a set of corrected method parameters $PAR_1$ can be selected from the rule database F in method step g, wherein on account of the concordance of the mass integrals from the database and the component to be manufactured, the modified set of method parameters can be made available to the control device H in a step h. With this the component can then be manufactured.

It is possible to employ a scanning speed of the laser beam of at least 500 mm/s and at most 2000 mm/s, of at least 800 mm/s and at most 1200 mm/s, a laser power of at least 125 W and at most 250 W, of at least 150 W and at most 250 W, a track spacing of at least 60 and at most 130 µm, at least 80 and at most 120 µm, and/or a layer thickness of the powder layers of at least 20 µm and at most 50 µm.

For laser melting, a powder having grain sizes of at least 10 µm and at most 45 µm can be used, wherein a size distribution D50 (i.e. 50% of the particles are smaller than this value) is at least 17 µm and at most 27 µm. Powders having such a size distribution can be manufactured well using powder-bed-based additive manufacturing methods since they can be apportioned reliably in the powder bed.

What is claimed is:

1. A method for determining building specifications describing process control for the additive manufacturing of a building structure on the basis of a simulation of the manufacture of the building structure, the method comprising:
   accessing a manufacturing data set for the building structure, the manufacturing data set describing the building structure in layers to be manufactured;
   calculating a global heat development in already manufactured layers of the building structure based at least in part on a building history of the building structure and heat input by an energy beam;
   determining a local heat development in a vicinity of the heat input by the energy beam;
   determining the process control based at least in part on the global heat development and the local heat development;
   loading correction measures of the process control from a database based at least in part on the global heat development and the local heat development; and
   assigning the correction measures locally to individual vectors of a tool path of the energy beam; wherein
      at least one mass integral is calculated for individual vectors of the tool path; and
      correction measures are determined on the basis of a comparison of the calculated mass integral with mass integrals stored in the database.

2. The method as claimed in claim 1, wherein the correction measures of the process control are determined in such a way that a melt pool produced by the energy beam has a size that is in a defined interval.

3. The method as claimed in claim 1, further comprising calculating a mass integral for individual vectors of the tool path over a defined integration volume;
   wherein the integration volume contains a part of the surface of the building structure facing the energy beam; and
   wherein a point of the vector considered lies in the integration volume.

4. The method as claimed in claim 3, further comprising calculating at least one mass integral at the beginning and one mass integral at the end of the vector for the vectors.

5. The method as claimed in claim 4, further comprising selecting, from the mass integrals calculated per vector, a mass integral with a lowest value.

6. The method as claimed in claim 4, further comprising calculating a value corresponding to a mean value of the mass integrals from the mass integrals calculated per vector.

7. The method as claimed in claim 3, wherein in order to determine the correction measures for a vector considered:
   the calculated mass integral is compared with mass integrals stored in the database;
   that stored mass integral most similar to the calculated mass integral is selected from the database; and
   the correction measures of the process control stored with the selected mass integral are selected for the vector considered.

8. The method as claimed in claim 3, wherein to determine the correction measures in the form of correction values for a vector considered:
   the calculated mass integral is compared with mass integrals stored in a database;
   those stored mass integrals which are the most similar to the calculated mass integral are selected from the database; and
   the correction values for process parameters of the process control stored with the selected mass integrals are selected for the vector considered and an interpolation of said correction values is carried out, wherein the result of the interpolation is used as a resulting correction value for the correction.

9. The method as claimed in claim 3, wherein the mass integral has the shape of an ellipsoid or of a semi-ellipsoid having a semi-axis δr in the x-y-plane of the layer to be manufactured and δz in the z-direction.

10. The method as claimed in claim 1, wherein the correction measures include at least one of: a reduction of the power of the energy beam, a lengthening of the pause times between the irradiation times of individual vectors, an increase of the movement speed of the energy beam, an increase of the hatch distance between the vectors, an alteration of the vector order, an alteration of the vector length, an alteration of the vector orientation.

11. A method for determining correction measures for building specifications describing process control for additive manufacturing of building structures on the basis of a simulation, the method comprising:

defining process parameters for the process control are defined;

accessing a manufacturing data set for the building structure, said manufacturing data set describing the building structure in layers to be manufactured;

assessing a global heat development in the form of a reference temperature;

calculating local heat development in the vicinity of the heat input by an energy beam;

calculating the local heat development in the vicinity of the heat input by the energy beam for representative volume elements with a predefined geometry;

if a calculated heat development exceeds a threshold, assigning correction measures of the process control locally to individual vectors of a tool path of the energy beam;

calculating a mass integral over a partial volume of the representative volume element in which the correction measures are required; and storing the correction measures with the associated mass integral in a database.

12. The method as claimed in claim 11, wherein the representative volume elements have the shape of parallelepipeds, prisms having two lateral surfaces extending parallel to the layers and at least one lateral surface extending at an inclination to the layers and connecting the parallel lateral surfaces, and/or triangular prisms having a lateral surface extending parallel to the layers.

13. The method as claimed in claim 11, further comprising using a parallelepipedal representative volume element, the boundary of which is surrounded all around by the material of the building structure, to ascertain reference values for the process control;

wherein the correction parameters aim to reduce the energy input of the energy beam.

14. The method as claimed in claim 11, further comprising calculating a melt pool size by calculating the mass integral over a partial volume of the representative volume element containing a part of the surface of the representative volume element facing the energy beam, localized on a plurality of points of the tool path;

wherein for said points the melt pool size is calculated taking account of the local heat development and the reference temperature.

15. The method as claimed in claim 11, wherein the mass integral has the shape of an ellipsoid or of a semi-ellipsoid having a semi-axis $\delta r$ in the x-y-plane of the layer to be manufactured and $\delta z$ in the z-direction.

* * * * *